(12) United States Patent
Dobashi et al.

(10) Patent No.: US 8,091,206 B2
(45) Date of Patent: Jan. 10, 2012

(54) METHOD OF TWISTING COIL WIRE TO MAKE COIL ASSEMBLY FOR USE IN ELECTRIC ROTARY MACHINE

(75) Inventors: Masaomi Dobashi, Kariya (JP); Akito Akimoto, Kariya (JP)

(73) Assignee: Denso Corporation, Kariya (JP)

( * ) Notice: Subject to any disclaimer, the term of this patent is extended or adjusted under 35 U.S.C. 154(b) by 354 days.

(21) Appl. No.: 12/493,419

(22) Filed: Jun. 29, 2009

(65) Prior Publication Data

US 2009/0320275 A1 Dec. 31, 2009

(30) Foreign Application Priority Data

Jun. 30, 2008 (JP) .................. 2008-171586

(51) Int. Cl.
*H02K 15/04* (2006.01)
(52) U.S. Cl. .............. 29/596; 29/605; 310/207
(58) Field of Classification Search ............. 29/596, 29/598, 605, 606; 310/207
See application file for complete search history.

(56) References Cited

U.S. PATENT DOCUMENTS 6,140,735 A * 10/2000 Kato et al. .............. 310/201
2001/0019234 A1 9/2001 Murakami et al.
2004/0040142 A1 3/2004 Hirota et al.
2006/0005376 A1 1/2006 Hirota et al.

FOREIGN PATENT DOCUMENTS

JP 2002-176752 6/2002
JP 2004-104841 4/2004

OTHER PUBLICATIONS

U.S. Appl. No. 12/398,567, Gorohata et al., filed Mar. 5, 2009.

* cited by examiner

*Primary Examiner* — Livius R Cazan
(74) *Attorney, Agent, or Firm* — Nixon & Vanderhye PC

(57) ABSTRACT

A method of producing a coil assembly to be wound in a stator core with a plurality of slots. The method prepares a first and a second coil wire each of which is made up of in-slot portions and turned portions, arranges the first and second coil wires in parallel with the turned portions being offset from each other in a lengthwise direction thereof, moves the first coil wire to establish engagement of the turned portions of the first and second coil wires, turns the first coil wire about a pivot where the turned portions engage, crosses the first coil wire over the second coil wire around the pivot, and turns the first coil wire around the pivot so as to twist the turned portions of the first and second coil wires together. This sequence of steps is repeated to twist or braid the first and second coil wires without undesirable deformation thereof.

4 Claims, 13 Drawing Sheets

METHOD OF TWISTING COIL WIRE TO MAKE COIL ASSEMBLY FOR USE IN ELECTRIC ROTARY MACHINE

CROSS REFERENCE TO RELATED DOCUMENT

The present application claims the benefit of Japanese Patent Application No. 2008-171586 filed on Jun. 30, 2008, the disclosure of which is incorporated herein by reference.

BACKGROUND OF THE INVENTION

1. Technical Field of the Invention

The present invention relates generally to a method of braiding or twisting coil wires to make a coil assembly which may be employed in an electric rotary machine such as a motor-generator for automotive vehicles.

2. Background Art

There have been proposed a variety of methods of producing a coil assembly for use in electric rotary machines such as motor-generators. For example, Japanese Patent First Publication No. 2002-176752 teaches winding a plurality of coil wires simultaneously using a pair of winding strip cores. Japanese Patent First Publication No. 2004-104841 teaches how to braid a first coil wire and a second coil wire. Specifically, the first coil wire is turned through 90° around the axis of the second coil wire, as having been shaped into triangular waves in a winding process, and moved so as to make an overlap therebetween by half a turn, and also turned through 90° around the axis of the second coil wire. This sequence of steps is repeated to braid the first coil wire over the second coil wire by half a turn.

The braiding of coil wires each of which has a plurality of turned portions may also be achieved by turning a first coil wire around a second coil wire, like in conventional wire stranding machines, and moving the first coil wire by a coil pitch per turn or holding two coil wires crossed a given angle and rotating them around each other.

The above methods are, however, needed to keep the angle which the first and second coil wires make with each other as great as possible in order to avoid physical interference between the turned portions during the rotation of the first and second coil wires. This may result in undesirable deformation of straight portions of the first and second coil wires which are to be disposed inside slots of a stator core, which leads to a difficulty in shaping the braided coil wires into a desired geometry.

SUMMARY OF THE INVENTION

It is therefore a principal object of the invention to provide a method of producing a coil assembly which may be employed in electric rotary machines and is made up of braided or twisted coil wires without undesirable deformation thereof.

According to one aspect of the invention, there is provided a method of producing a coil assembly for use in an electric rotary machine. The coil assembly is to be wound in a core in which a plurality of slots are formed. The coil assembly includes at least a first and a second coil wire each of which has a length made up of in-slot portions to be disposed in the slots of the core and turned portions. The in-slot portions extend substantially straight in parallel to each other. Each of the turned portions connects between adjacent two of the in-slot portions. The turned portions are located on a first side and a second side opposed across the width of a corresponding one of the first and second coil wires alternately. The method comprises the steps of: (a) an arrangement step of arranging the first and second coil wires substantially in parallel to each other, with the turned portions of the first coil wire being offset from those of the second coil wire in a lengthwise direction thereof; (b) an engagement step of moving the first coil wire substantially parallel to the second coil wire in a widthwise direction thereof to establish engagement of a first turned portion that is one of the turned portions of the first coil wire located on the first side with a first turned portion that is one of the turned portions of the second coil wire located on the second side; (c) a first turning step of turning a portion of the first coil wire, as located on a side of the engagement, relative to a portion of the second coil wire, as located on the side of the engagement, in the widthwise direction about a pivot where the first turned portions of the first and second coil wires engage; (d) a crossing step of crossing the portion of the first coil wire over the portion of the second coil wire around the pivot; (e) a second turning step of turning the portion of the first coil wire around the pivot relative to the portion of the second coil wire in a direction opposite that in the first turning step; and (f) a moving step of moving the first coil wire relative to the second coil wire to place the first and second coil wires so as to extend substantially parallel to each other in the lengthwise direction thereof to twist the first turned portions of the first and second coil wires together.

In the arrangement step, the first and second coil wires are, as described above, offset from each other. Such an offset distance is greater than or equal to the diameter of the first and second coil wires and smaller than or equal to a length of the turned portions minus the diameter of the first and second coil wires. In other words, the offset distance is so selected that each of the in-slot portions of either of the first and second coil wires lies between adjacent two of the in-slot portions of the other of the first and second coil wires, that is, a portion of each of the turned portions of the first coil wire is laid to overlap a portion of one of the turned portions of the second coil wire, as viewed in the direction perpendicular to the length of the first and second coil wires. This arrangement permits the subsequent steps to be performed.

The above sequence of steps may be repeated to twist or brain the first and second coil wires together with the turned portions of the first coil wire being crossed over those of the second coil wire. In the first and second turning steps, the first coil wire is turned or rotated about the pivot where the turned portions of the first and second coil wires engages, thereby minimizing the angle which the first and second coil wires make with each other and which is required to enable the turned portions of the first and second coil wires to be crossed over each other. This enables the first and second coil wires to be braided without undesirable deformation thereof.

In the preferred mode of the invention, in the arrangement step, the turned portions of the first coil wire may be offset from those of the second coil wire by a pitch of the slots of the core, thereby facilitating ease of disposing the in-slot portion of the first and second coil wires in the slots of the core.

According to another aspect of the invention, there is provided a method of producing a coil assembly for use in an electric rotary machine. The coil assembly being to be wound in a core in which a plurality of slots are formed. The coil assembly includes a plurality of coil wires each of which has a length made up of in-slot portions to be disposed in the slots of the core and turned portions. The in-slot portions extend substantially straight in parallel to each other. Each of the turned portions connects between adjacent two of the in-slot portions. The turned portions are located on a first side and a second side opposed across the width of a corresponding one of the coil wires alternately. The method comprises the steps of: (a) an arrangement step of arranging a first and a second coil wire bundle, each of which is made up of a given number of the coil wires tied up together in a given condition, and placing the first and second coil wire bundles substantially in parallel to each other, with turned portions of the first coil wire bundle, each of which is a collection of the turned portions of the coil wires, being offset from those of the second coil wire bundle in a lengthwise direction thereof; (b) an engagement step of moving the first coil wire bundle substantially parallel to the second coil wire bundle in a widthwise direction thereof to establish engagement of a first turned portion that is one of the turned portions of the first coil wire bundle located on the first side with a first turned portion that is one of the turned portions of the second coil wire bundle located on the second side; (c) a first turning step of turning a portion of the first coil wire bundle, as located on a side of the engagement, relative to a portion of the second coil wire bundle, as located on the side of the engagement, in the widthwise direction about a pivot where the first turned portions of the first and second coil wire bundles engage; (d) a crossing step of crossing the portion of the first coil wire bundle over the portion of the second coil wire bundle around the pivot; (e) a second turning step of turning the portion of the first coil wire bundle around the pivot relative to the portion of the second coil wire bundle in a direction opposite that in the first turning step; and (f) a moving step of moving the first coil wire bundle relative to the second coil wire bundle to place the first and second coil wire bundles so as to extend substantially parallel to each other in the lengthwise direction thereof to twist the first turned portions of the first and second coil wire bundles together.

The above method is different from that in the first aspect only in that the first and second coil wire bundles, each of which is made up of the plurality of coil wires, are twisted or braided. Therefore, the arrangement step, the engagement step, the first turning step, the crossing step, the second turning step, and the moving step are substantially identical with those in the method of the first aspect.

For example, in the case where the coil assembly is fabricated by three-phase windings which are made by a total of twelve coil wires twisted, the in-slot portions of the first coil wire and the seventh coil wire, the second and eighth coil wires . . . , the fifth and eleventh coil wires, and the sixth and the twelfth coil wires are laid to overlap in the slots. Therefore, when the seven or more coil wires are used to fabricate the coil assembly, it increases the possibility that the coil wires physically interfere with each other or any of the coil wires is caught in the other coil wire during the twisting thereof. The use of the first and second coil wire bundles, each of which is made up of the coil wires twisted and tied up into a desired geometry, alleviates the above problem.

In the preferred mode of the invention, in the arrangement step, the turned portions of the first coil wire bundle are offset from those of the second coil wire bundle by a distance associated with a pitch of the slots of the core.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1A:
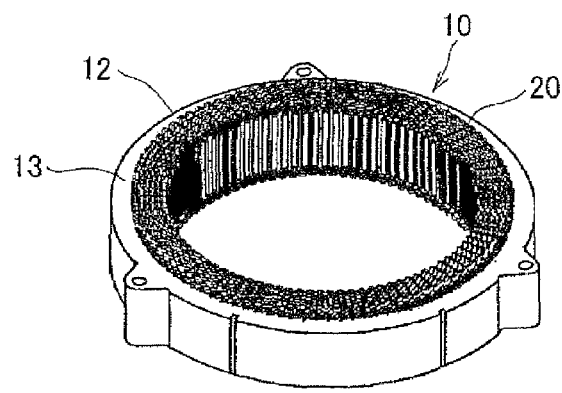
FIG. 1(a) is a perspective view which shows a stator with a coil assembly produced in a manner according to the invention.
Figure 1B:
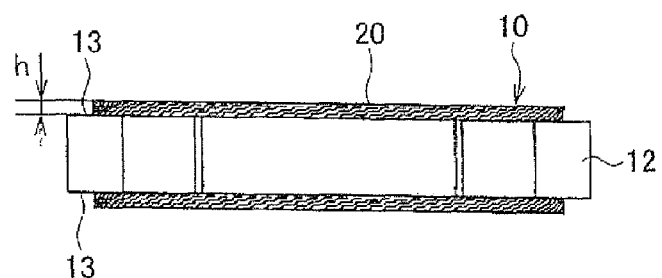
FIG. 1(b) is a side view of FIG. 1(a)
Figure 2:
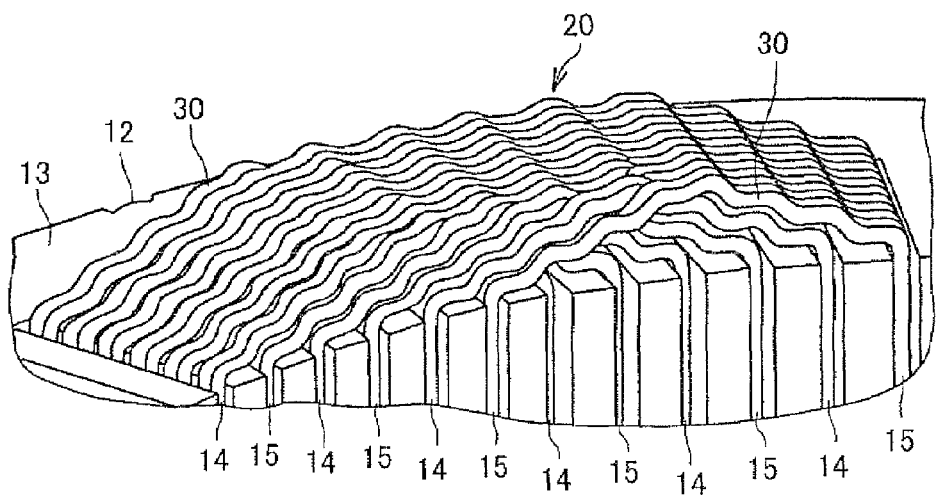
FIG. 2 is a partially enlarged view which shows an essential part of the coil assembly of FIGS. 1(a) and 1(b)

Referring to the drawings, wherein like reference numbers refer to like parts in several views, particularly to FIGS. 1(a) and 1(b), there is shown a stator 10 which is equipped with a coil assembly 20 according to the invention. FIG. 1(a) is a perspective view which shows the stator 10. FIG. 1(b) is a side view of FIG. 1(a). FIG. 2 is a partially enlarged view which shows an essential part of the coil assembly 20.

The stator 10, as illustrated in FIGS. 1(a) and 1(b), is designed for use in electric rotary machines such as motor-generators for automotive vehicles. The stator 10 has a rotor (not shown) retained inside an inner periphery thereof to be rotatable. The rotor has a plurality of permanent magnets arrayed on an outer circumference thereof facing an inner circumference of the stator 10. The permanent magnets are so oriented as to have S-poles and N-poles arrayed alternately in the circumferential direction of the rotor. The stator 10 has a stator core 12 made of annular magnetic steel plates which have a given thickness and are staked in an axial direction of the stator 10. The stator core 12, as can be seen from FIG. 2, has a plurality of pairs of slots 14 and 15 formed in an entire inner periphery thereof. Specifically, each of the slots 14 and 15 extends straight in a widthwise direction (i.e., a vertical direction, as viewed in FIGS. 1(a) and 1(b)) of the stator core 12 and, as can be seen in FIG. 2, occupies only an inside portion of the thickness of the stator core 12. The coil assembly 20 makes up three-phase stator windings. Each of the three-phase windings is disposed in each of the two adjacent slots 14 and 15. The three-phase windings are disposed in the stator core 12 in units of circumferentially adjacent three of the pairs of the slots 14 and 15.

Figure 3:
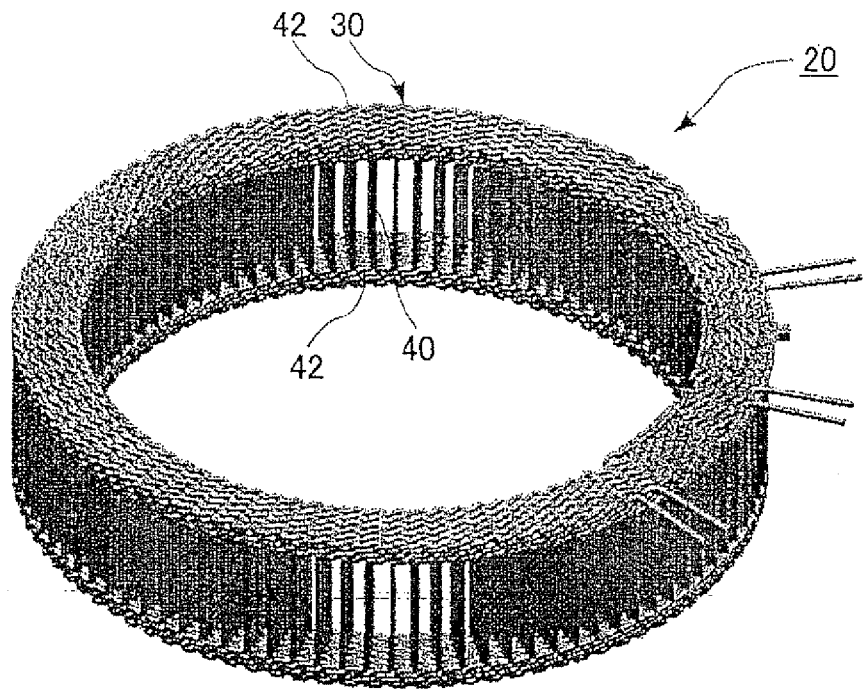
FIG. 3 is a perspective view which shows the coil assembly built in the stator, as illustrated in FIGS. 1(a) and 1(b)
Figure 4:
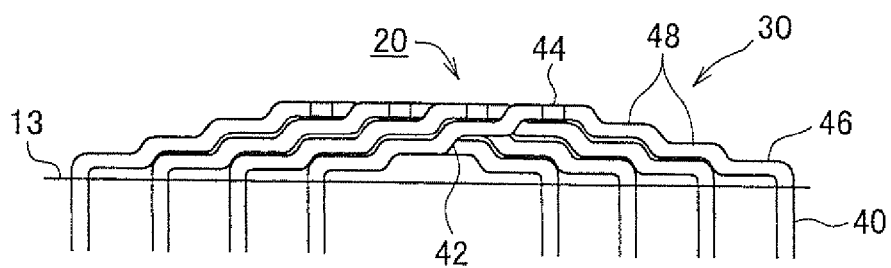
FIG. 4 is a front view which shows a coil end of the coil assembly of FIG. 3.
Figure 5:
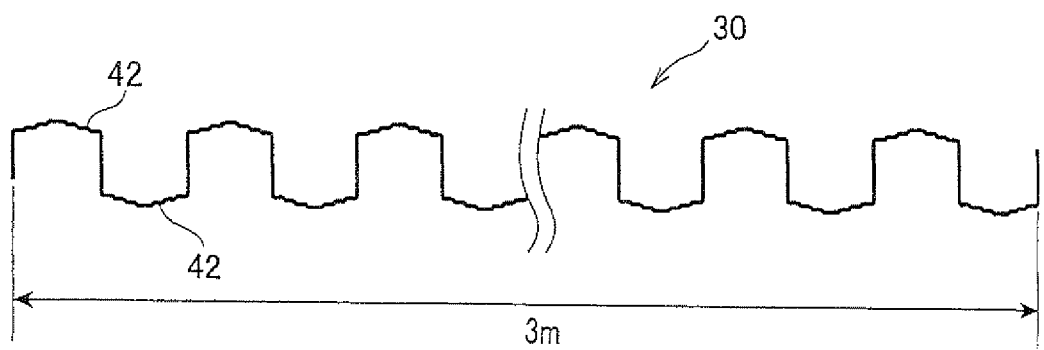
FIG. 5 is a front view which shows one of coil wires making up the coil assembly of FIG. 3.
Figure 6:
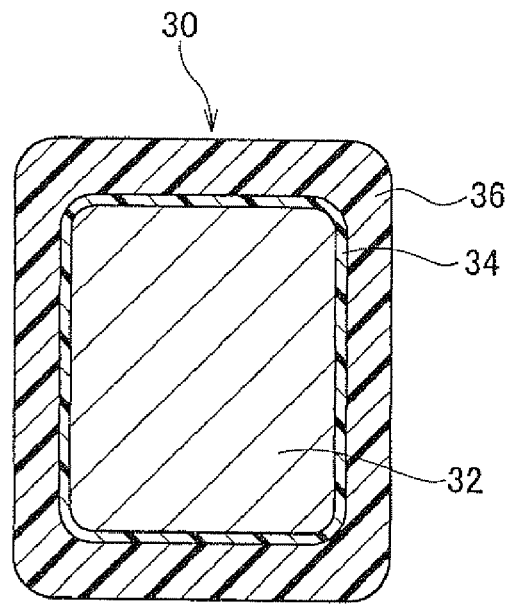
FIG. 6 is a transverse sectional view which shows the coil wire of FIG. 5.
Figure 7:
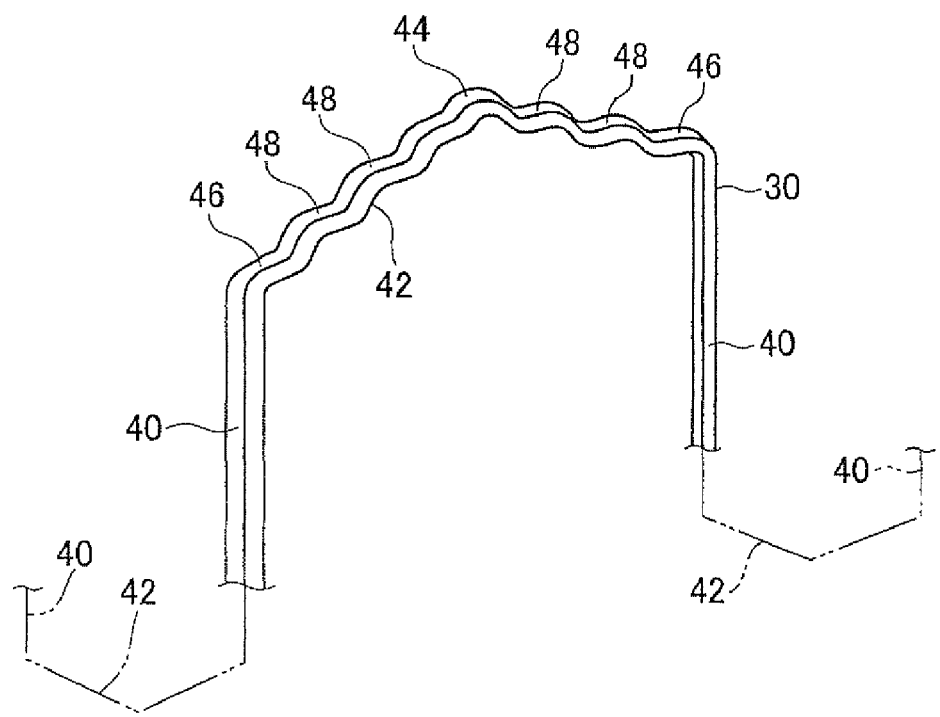
FIG. 7 is a perspective view which shows a turned portion of the coil wire of FIG. 5.

FIG. 3 is a perspective view which shows the coil assembly 20. FIG. 4 is a front view which shows a coil end of the coil assembly 20. FIG. 5 is a front view which shows one of coil wires 30 making up the coil assembly 20. FIG. 6 is a transverse sectional view which shows the coil wire 30. FIG. 7 is a perspective view which shows a turned portion 42 of the coil wire 30.

Each of the coil wires 30 of the coil assembly 20 has, as illustrated in FIG. 5, the turned portions 42 arrayed at a given pitch or interval. The coil wire 30 is, as illustrated in FIG. 6, made of a copper conductor 32 and an insulating film wrapped about the conductor 32 to insulate the conductor 32 electrically. The insulating film includes an inner layer 34 and an outer layer 36. The inner layer 34 covers the outer periphery of the conductor 32 fully. The outer layer 36 covers the outer periphery of the inner layer 34 fully. A total thickness of the insulating film (including thicknesses of the inner and outer layers 34 and 36) is 100 µm to 200 µm. Such a great thickness of the insulating film eliminates the need for insulating the coil wires 30 electrically from each other using insulating paper.

The outer layer 36 is made of insulating material. The inner layer 34 is made of insulating material such as thermoplastics resin which is higher in glass-transition temperature than the outer layer 36 or polyamide having no glass-transition temperature. Therefore, when subjected to heat, as produced in the electric rotary machine, the outer layer 36 melts at an earlier time than the inner layer 34, thereby causing portions of the coil wires 30 disposed in the same slot 14 to be bonded thermally at the outer layers 36. The coil wires 30 in each of the slots 14 and 15 are, therefore, substantially changed into a one-piece winding, thus resulting in an increase in mechanical strength of the coil wires 30 in the slots 14.

Each of the coil wires 30 includes, as illustrated in FIGS. 2 and 4, in-slot portions 40 each of which is to be disposed in either of the slots 14 and 15 of the stator core 12 and the turned portions 42 each of which connects between two of the in-slot portions 40, as located away from each other in a circumferential direction of the stator core 12, and extends outside either of opposed ends of the stator core 12. Each of the coil wires 30 is so shaped that each of odd ones of the turned portions 42 are located 180° electric angle out of phase with an adjacent even one around the axial direction of the stator core 12.

The middle of each of the turned portions 42 is, as illustrated in FIG. 7, substantially shaped in the form of a crank 44 without twisting.

Figure 8A:
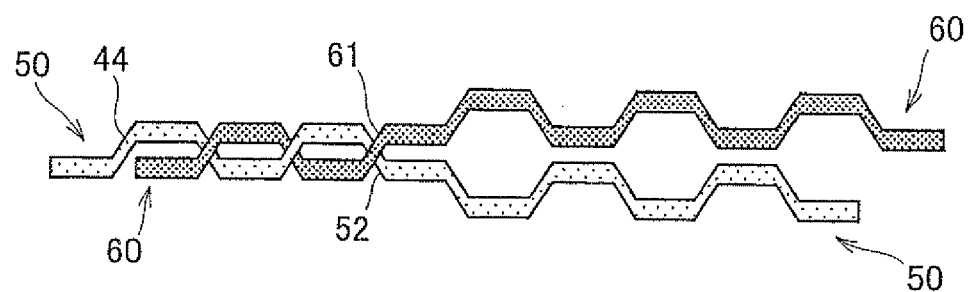
FIG. 8(a) is a plan view which shows an arrangement step that is one of a sequence of steps to produce the coil assembly of FIG. 3 according to the first embodiment of the invention.

The crank 44 is, as can be seen in FIG. 3(a), offset in the radial direction of the stator core 12 (i.e., a vertical direction, as viewed in FIG. 8(a)). The amount of offset of the turned portion 42 in the radial direction of the stator core 12 is within the width of the coil wire 30, thereby enabling the turned portions 42 of the coil wires 30 to be wound tightly without physical interference between the turned portions 42 arrayed in the radial direction of the stator core 12. This results in a decrease in radial width of the coil ends projecting from the ends of the stator core 12, thus avoiding the overhanging of the coil assembly 20 in the radial direction of the stator core 12.

Each of the turned portions 42 also has cranks 46 which continue directly from the in-slot portions 40 and extend substantially along and on one of the axial ends 13 of the stator core 12. This causes the interval between ends of a section of the turned portion 42 which is located away from the end 13 of the stator core 12, in other words, the base of a triangle, as defined by the turned portion 42 and the end 13, to be smaller than the interval between two of the slots 14 or 15 in which the in-slot portions 40 of the turned portion 42 are disposed, thus resulting in a decrease in height h of the coil ends.

If the length of each of the cranks 46 of the turned portions 42 which extend substantially parallel to the end 13 of the stator core 12 is defined as d1, and the interval between adjacent two of the slots 14 and 15 in the circumferential direction of the stator core 12 is defined as d2, a relation of d1≦d2 is met. This avoids the physical interference of each of the cranks 46 of the coil wires 30 with one of the coil wires 30 (i.e., the turned portions 42) extending from an adjacent one of the slots 14 or 15 without need for increasing the height of the coil ends in the axial direction of the stator core 12 or the width of the coil ends in the radial direction of the stator core 12, thus avoiding the overhanging of the coil assembly 20 in the radial direction of the stator core 12.

Each of the turned portions 42 of the coil wires 30 also has two consecutive cranks 48 formed between the central crank 44 and each of the outer cranks 46. Specifically, each of the turned portions 42 extending outside one of the ends 13 of the stator core 12 has a total of the seven cranks 44, 46, and 48. This results in a decrease in height h of the turned portions 42 as compared with when the turned portions 42 have no cranks. The cranks 48 are identical in configuration with the cranks 44 and 46 and extend substantially parallel to either of the ends 13 of the stator core 12. In other words, each of the turned portions 42 is shaped stepwise outwardly from the central crack 44.

The coil assembly 20 is, as described above, made of three-phase windings. Each phase has the coil wires 30 disposed in the two slots 14 and 15 per pole of the rotor. In other words, a total number of the slots 14 and 15 per pole of the rotor which are located adjacent each other in the circumferential direction of the coil assembly 20 (i.e., the stator core 12) is 3×2=6. The in-slot portions 40 of each of the coil wires 30 are, as can be seen in FIG. 2, disposed in two of the slots 14 or 15 which are located six slots away from each other. Therefore, in order to avoid the physical interference between the turned portions 42 of the coil wires 30 extending outside adjacent two of the slots 14 and 15 of the stator core 12, each of the turned portions 42 is preferably designed to have the seven (3×2+1) cranks 44, 46, and 48. This permits the height and/or the width of the coil ends of the coil assembly 20 to be decreased.

FIGS. 8(a) to 13(b) demonstrate a production method of the coil assembly 20 according to the first embodiment of the invention. The coil assembly 20 in this embodiment is made by twisting two bundles: a first coil wire bundle 50 and a second coil wire bundle 60 each of which is made up of six coil wires 30 which are twisted or entwined into a given shape basically in the same manner, as described below or in the second embodiment. The first and second coil wire bundles 50 and 60 are each tied tightly by a string or a holder from being lost in shape.

Figure 8B:
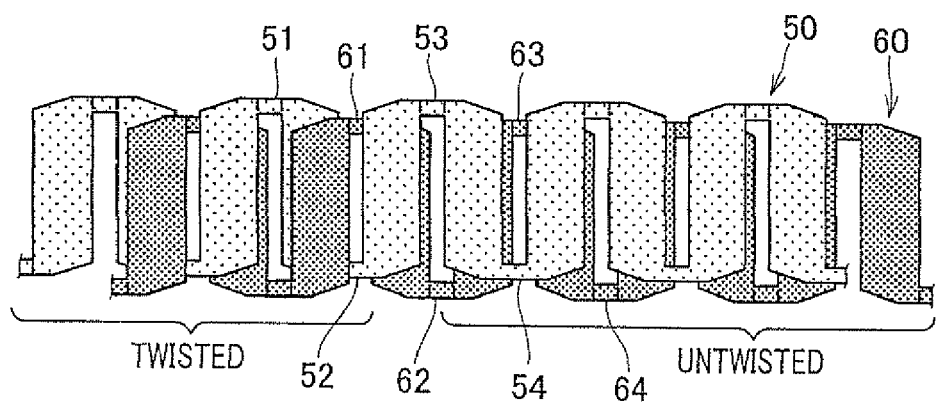
FIG. 8(b) is a front view of FIG. 8(a)

FIGS. 8(a), 9(a), 10(a), 11(a), 12(a), and 13(a) are plan views. FIGS. 8(b), 9(b), 10(b), 11(b), 12(b), and 13(b) are front views. FIGS. 8(a) and 8(b) illustrate the first and second coil wire bundles 50 and 60 which have already been twisted partly from left ends of thereof as viewed in the drawing, in the same manner, as described below. The explanation of the production method will start from the illustrated condition for the sake of convenience.

Figure 9A:
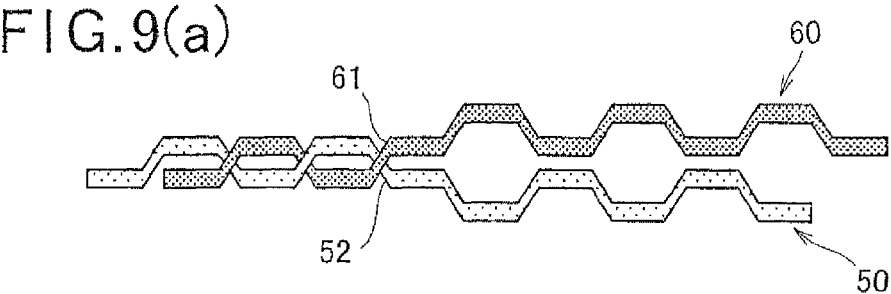
FIG. 9(a) is a plan view which shows an engagement step that is one of a sequence of steps to produce the coil assembly of FIG. 3.
Figure 10A:
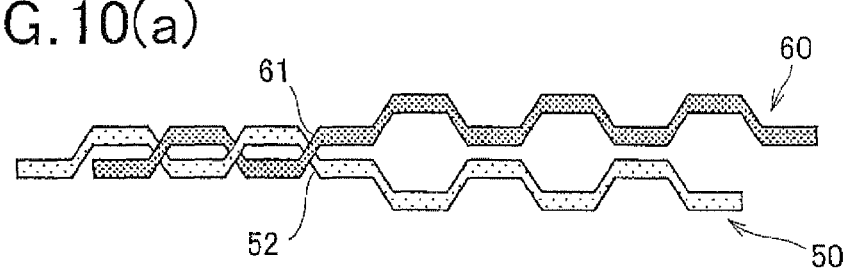
FIG. 10(a) is a plan view which shows a first turning step that is one of a sequence of steps to produce the coil assembly of FIG. 3.
Figure 10B:
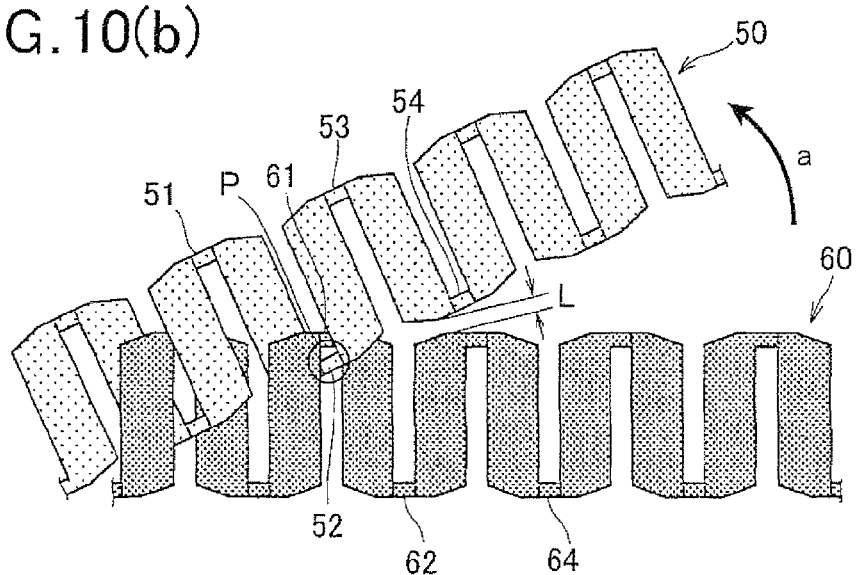
FIG. 10(b) is a front view of FIG. 10(a)
Figure 11A:
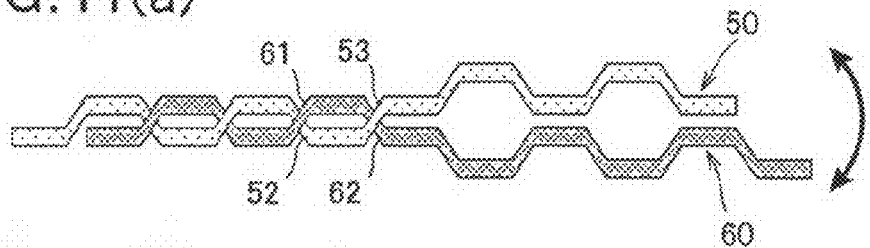
FIG. 11(a) is a plan view which shows a crossing step that is one of a sequence of steps to produce the coil assembly of FIG. 3.
Figure 11B:
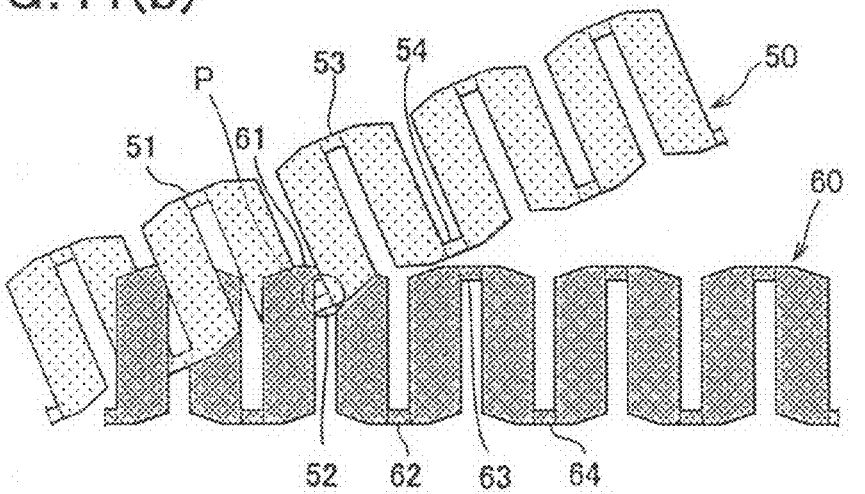
FIG. 11(b) is a front view of FIG. 11(a)
Figure 12A:
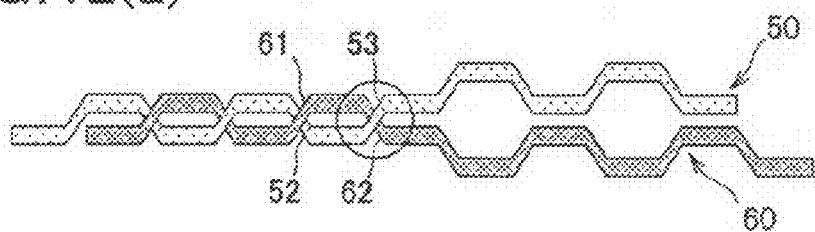
FIG. 12(a) is a plan view which shows a second turning step that is one of a sequence of steps to produce the coil assembly of FIG. 3.
Figure 12B:
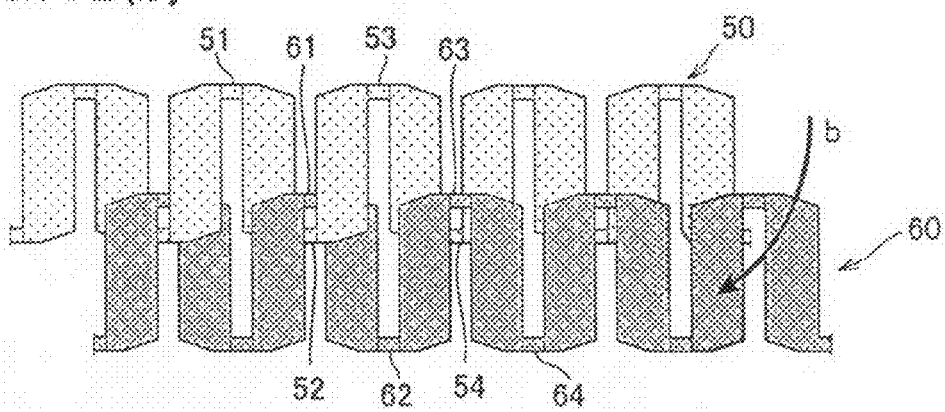
FIG. 12(b) is a front view of FIG. 12(a)
Figure 13A:
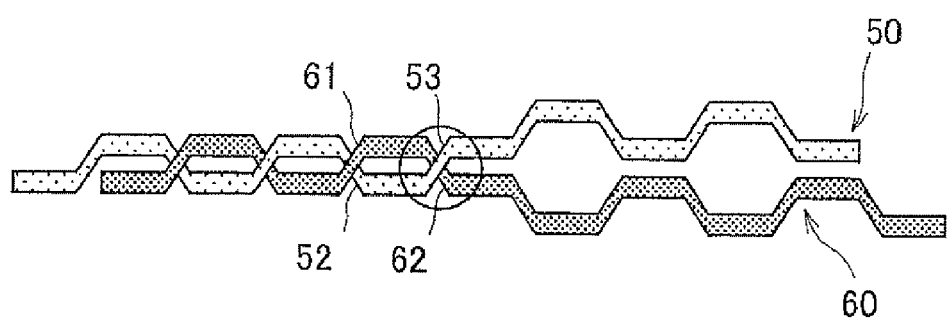
FIG. 13(a) is a plan view which shows a moving step that is one of a sequence of steps to produce the coil assembly of FIG. 3.
Figure 13B:
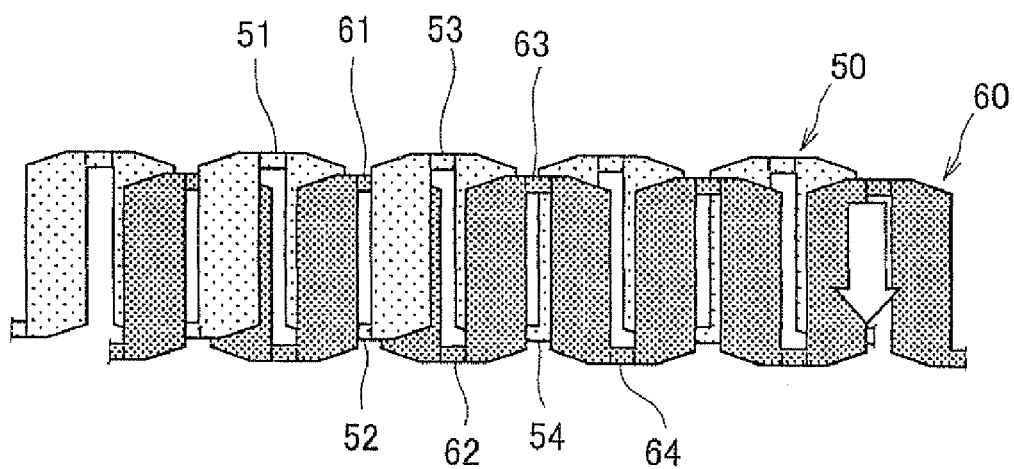
FIG. 13(b) is a front view of FIG. 13(a)

The production method includes an arrangement step, as illustrated in FIGS. 8(a) and 8(b), an engagement step, as illustrated in FIGS. 9(a) and (b), a first turning step, as illustrated in FIGS. 10(a) and 10(b), a crossing step, as illustrated in FIGS. 11(a) and 11(b), a second turning step, as illustrated in FIGS. 12(a) and 12(b), and a moving step, as illustrated in FIGS. 13(a) and 13(b).

First, in the arrangement step, the first and second coil wire bundles 50 and 60 are arranged substantially parallel to each other and shifted or offset, as illustrated in FIGS. 8(a) and 8(b), by a given distance (e.g., a pitch of the slots 14 and 15, that is, an interval between adjacent two of the slots 14 and 15) in an axial direction or a lengthwise direction thereof (i.e., a lateral direction in FIGS. 8(a) and 8(b)). A left portion of the first coil wire bundle 50 (which will be referred to as a second turned portion 52 below) is crossed over a left portion of the second coil wire bundle 60 (which will be referred to as a first turned portion 61 below). The first and second coil wire bundles 50 and 60 are placed, as viewed in the drawing, substantially parallel to each other. In the illustrated example, the second and first turned portions 52 and 61 are collections of the turned portions 42, that is, ones of turned portions of the first and second coil wire bundles 50 and 60 which have already been twisted, as described above, in a previous one of twisting cycles.

An untwisted portion of the first coil wire bundle 50 is, as viewed in FIG. 8(b), placed in front of that of the second coil wire bundle 60. Either of the first and second coil wire bundles 50 and 60 may be located outwardly in the direction in which the first and second coil wire bundles 50 and 60 overlap each other. In this example, the first coil wire bundle 50 will also be referred to as the outwardly located coil wire bundle.

Figure 9B:
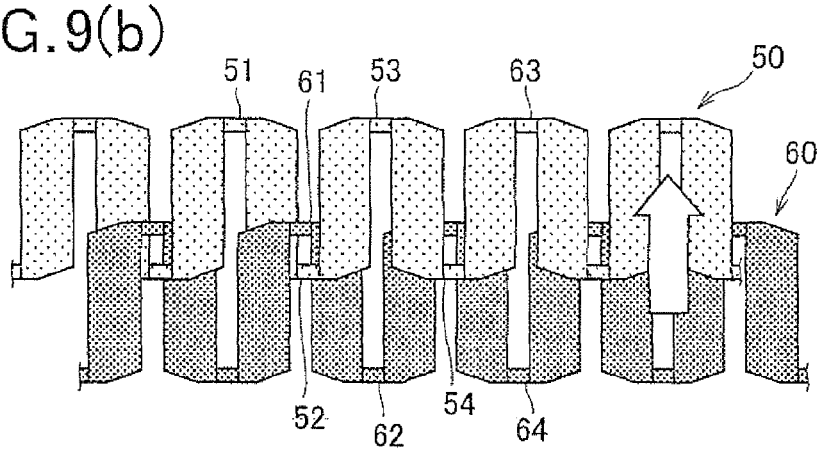
FIG. 9(b) is a front view of FIG. 9(a)

In the engagement step, the first coil wire bundle 50 is moved, as illustrated in FIGS. 9(a) and 9(b), upward parallel to the second coil wire bundle 60 to establish a mechanical engagement between the second turned portion 52 of the first coil wire bundle 50 located on the lower side in the widthwise direction thereof and the first turned portion 61 of the second coil wire bundle 60 located on the upper side in the widthwise direction thereof.

In the first turning step, as illustrated in FIGS. 10(a) and 10(b), the first coil wire bundle 50 is turned, as indicated by an arrow a, in a counterclockwise direction, as viewed in the drawing, about the pivot P where the second turned portion 52 of the first coil wire bundle 50 engages the first turned portion 61 of the second coil wire bundle 60 until the fourth turned portion 54 of the first coil wire bundle 50 is spaced apart from the third turned portion 63 of the second coil wire bundle 60 by a distance L. The turning of the first coil wire bundle 50 around the engagement between the second turned portion 52 and the first turned portion 61 allows the angle required to braid the first and second coil wire bundles 50 and 60 to be decreased. The second coil wire bundle 60 may alternatively be turned in a clockwise direction relative to the first coil wire bundle 50 in the same manner, as described above.

In the crossing step, as illustrated in FIGS. 11(a) and 11(b), a right portion of the first coil wire bundle 50 (i.e., the right side of the third turned portion 53) is moved behind the second coil wire bundle 60 so as to cross the third turned portion 53 of the first coil wire bundle 50 over the second turned portion 62 of the second coil wire bundle 60. In other words, the first and second coil wire bundles 50 and 60 are twisted one time at the pivot P.

In the second turning step, as illustrated in FIGS. 12(a) and 12(b), the first coil wire bundle 50 is turned, as indicated by an arrow b, in the clockwise direction (i.e., the direction opposite to that in the first turning step) about the pivot P to place the first coil wire bundle 50 substantially parallel to the second coil wire bundle 60 in the lengthwise direction thereof. The second coil wire bundle 60 may alternatively be turned in the counterclockwise direction relative to the first coil wire bundle 50 in the same manner, as described above.

Finally, in the moving step, as illustrated in FIGS. 13(a) and 13(b), the first coil wire bundle 50 is moved down until the first and second coil wire bundles 50 and 60 face in parallel to each other, that is, overlap each other fully, as viewed in the drawing. This places the first and second coil wire bundles 50 and 60 in a condition where the third turned portion 53 of the first coil wire bundle 50 is twisted or entwined with the second turned portion 62 of the second coil wire bundle 60 with a portion of the first coil wire bundle 50 on the right side of the third turned portion 53 (i.e., the fourth turned portion 54 or following turned portions) extending behind the second coil wire bundle 60.

After the completion of the moving step of FIGS. 13(a) and 13(b), the locations of the untwisted portions of the first and second coil wire bundles 50 and 60 are opposite to those in FIGS. 8(a) and 8(b). In other words, the untwisted portion of the second coil wire bundle 60 is located in front of that of the first coil wire bundle 50 (i.e., below the first coil wire bundle 50, as viewed in FIG. 13(a)). Subsequently, the second coil wire bundle 60 is subjected to the same sequence of steps as in FIGS. 9(a) to 13(a) to twist the fourth turned portion 54 of the first coil wire bundle 50 and the third turned portion 63 of the second coil wire bundle 60 together.

After completion of the above sequence of steps, the untwisted portion of the first coil wire bundle 50 is located in front of that of the second coil wire bundle 60. The first coil wire bundle 50 is also subjected to the same sequence of steps as in FIGS. 9(a) to 13(a) to twist subsequent turned portions of the first and second coil wire bundles 50 and 60 together.

The above sequence of steps makes up one twisting cycle. Ones of the turned portions of the first and second coil wire bundles 50 and 60 which have been twisted in a previous one of the twisting cycles will be handled as the second turned portion 52 of the first coil wire bundle 50 and the first turned portion 61 of the second coil wire bundle 60 in a following one of the twisting cycles.

When the total of twelve coil wires 30 have been twisted in the above manner, the coil wires 30 are respectively turned or moved parallel to each other to make desired geometry of overlaps of the turned portions 42. Ends of the coil wires 30 are welded to make a given number of connections thereof. Finally, the coil wires 30 are doughnut-shaped to complete the coil assembly 20, as illustrated in FIG. 3.

As apparent from the above discussion, the production method of the coil assembly 20 twists the first and second coil wire bundles 50 and 60 together at the pivot P where one of the turned portions of the first coil wire bundle 50 intersects and engages a corresponding one of the turned portions of the second coil wire bundle 60. This permits the angle which the first coil wire bundle 50 is turned and makes with the second coil wire bundle 60 in the first turning step to be decreased as compared with a conventional twisting manner, thus minimizing undesirable deformation of the first and second coil wire bundles 50 and 60.

The use of the first and second coil wire bundle 50 and 60 each of which is made up of the six coil wires 30 tied up to make the coil wires 30 twisted to fabricate the coil assembly 20 minimizes the physical interference between the coil wires 30 or catching of one of the coil wires 30 in another during twisting thereof and ensures the ease of twisting the coil wires 30.

Each of the first and second coil wire bundles 50 and 60 may alternatively be made of the number of the coil wires 30 other than six (6). The coil assembly 20 may alternatively be produced by using four or more coil wire bundles.

FIGS. 14 to 19 demonstrate a production method of the coil assembly 20 according to the second embodiment of the invention. The production method, as referred to in this embodiment, braids or twists three coil wires 70, 80, and 90 to make the coil assembly 20. Each of the coil wires 70, 80, and 90 is formed by pressing a piece of straight wire to have a plurality of in-slot portions and turned portions, like in FIG. 7.

Figure 14:
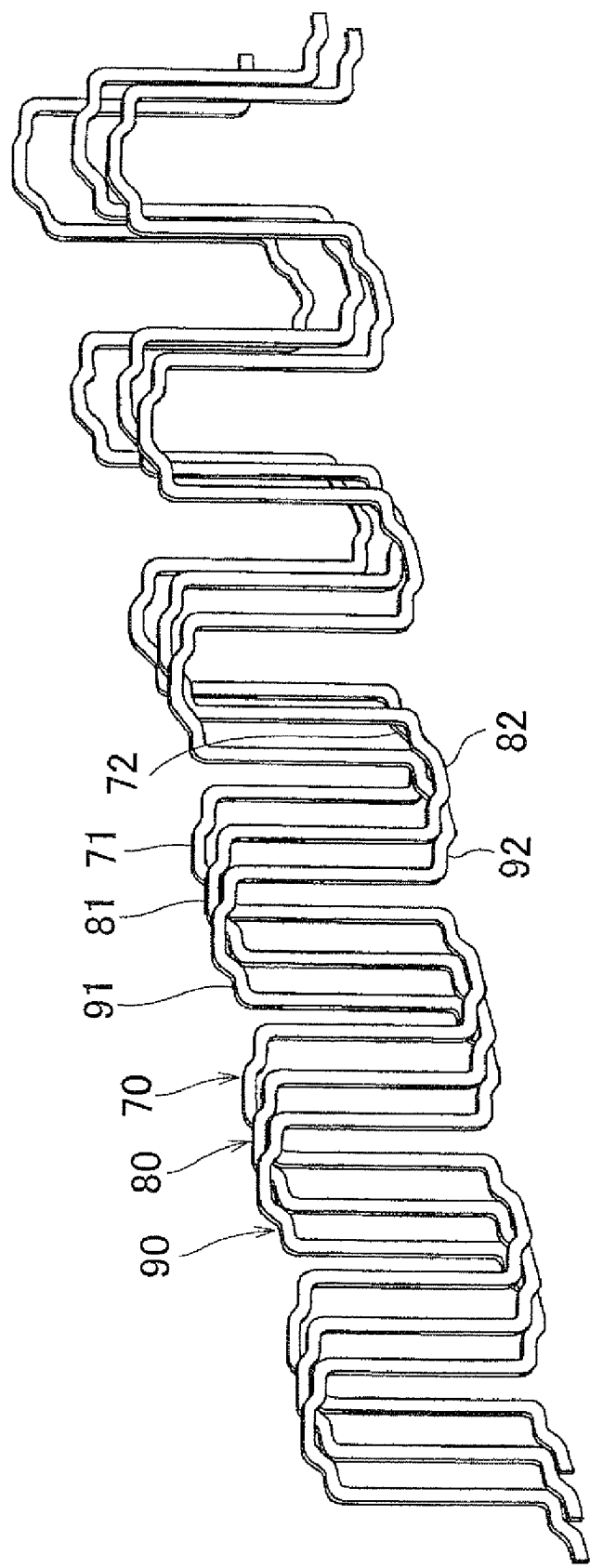
FIG. 14 is a perspective view shows two coil wires in an arrangement step that is a sequence of steps to produce the coil assembly of FIG. 3 according to the second embodiment of the invention.

FIG. 14 illustrates the first to third coil wires 70, 80, and 90 which have already been twisted partly from left ends of thereof, as viewed in the drawing, in the same manner, as described below. The explanation of the production method of the coil assembly 20 will start from the illustrated condition for the sake of convenience.

Figure 15:
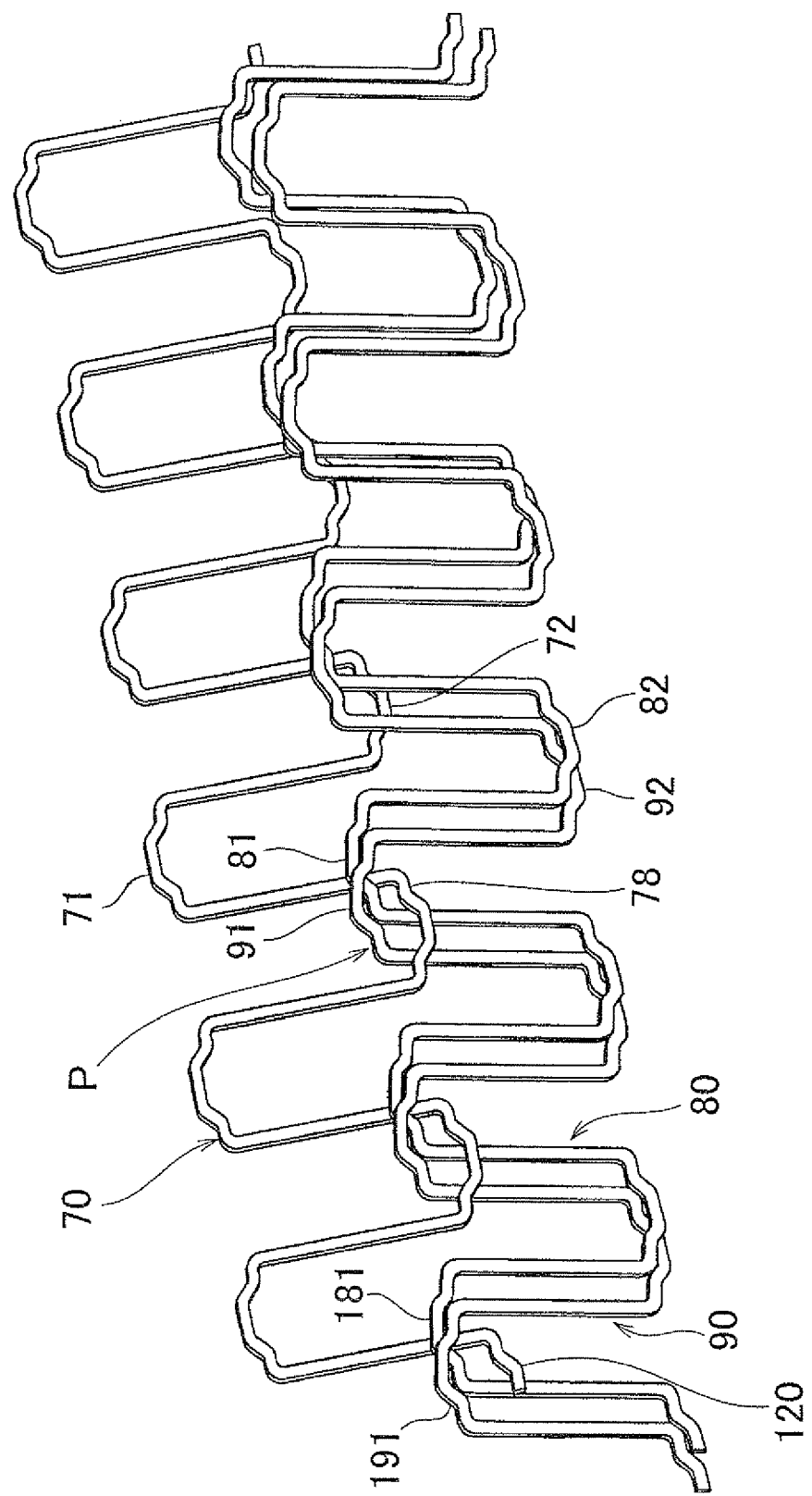
FIG. 15 is a perspective view shows two coil wires subjected to an engagement step, as performed following that in FIG. 14.
Figure 16:
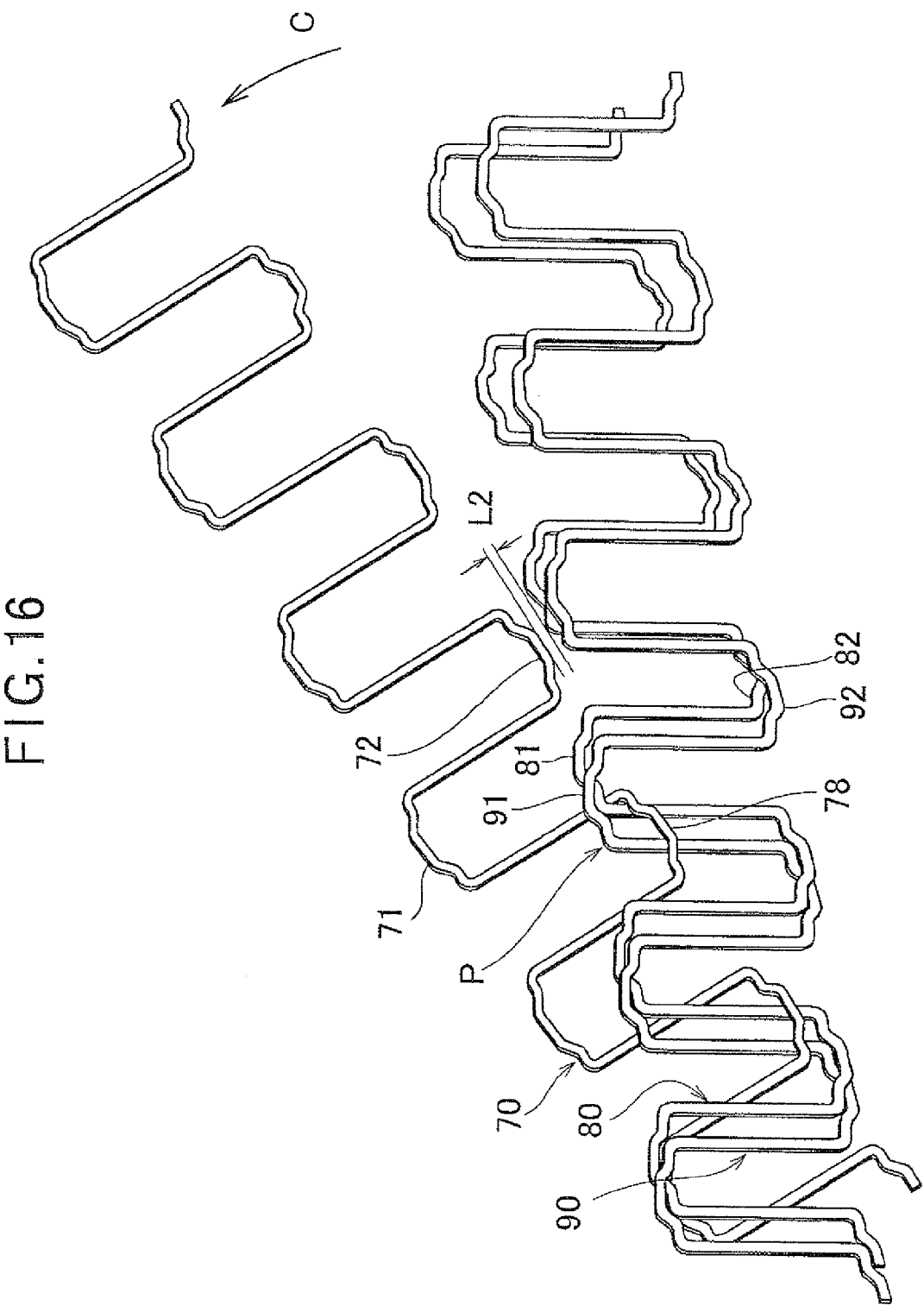
FIG. 16 is a perspective view shows two coil wires subjected to a first turning step, as performed following that in FIG. 15.
Figure 17:
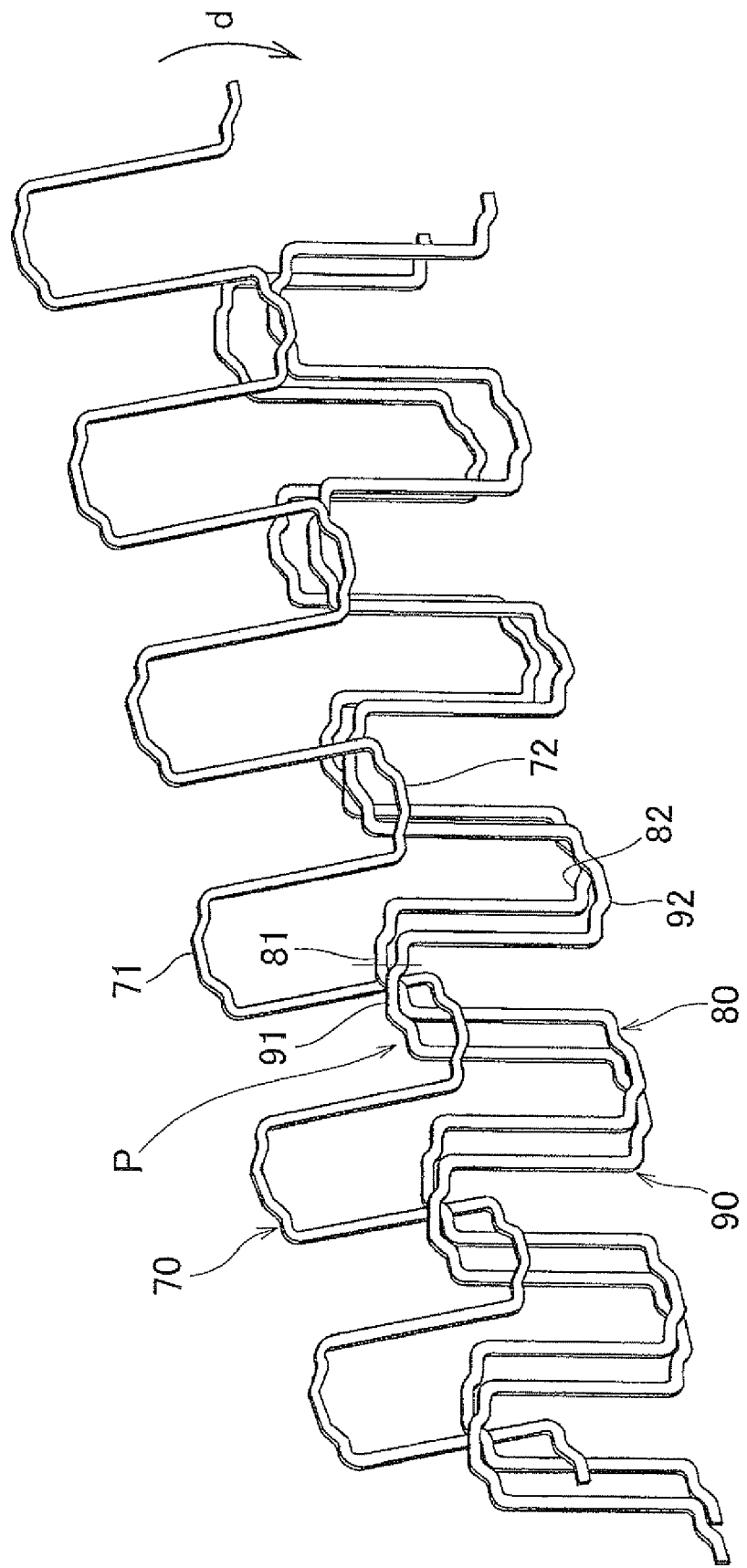
FIG. 17 is a perspective view shows two coil wires subjected to a second turning step, as performed following that in FIG. 16.
Figure 18:
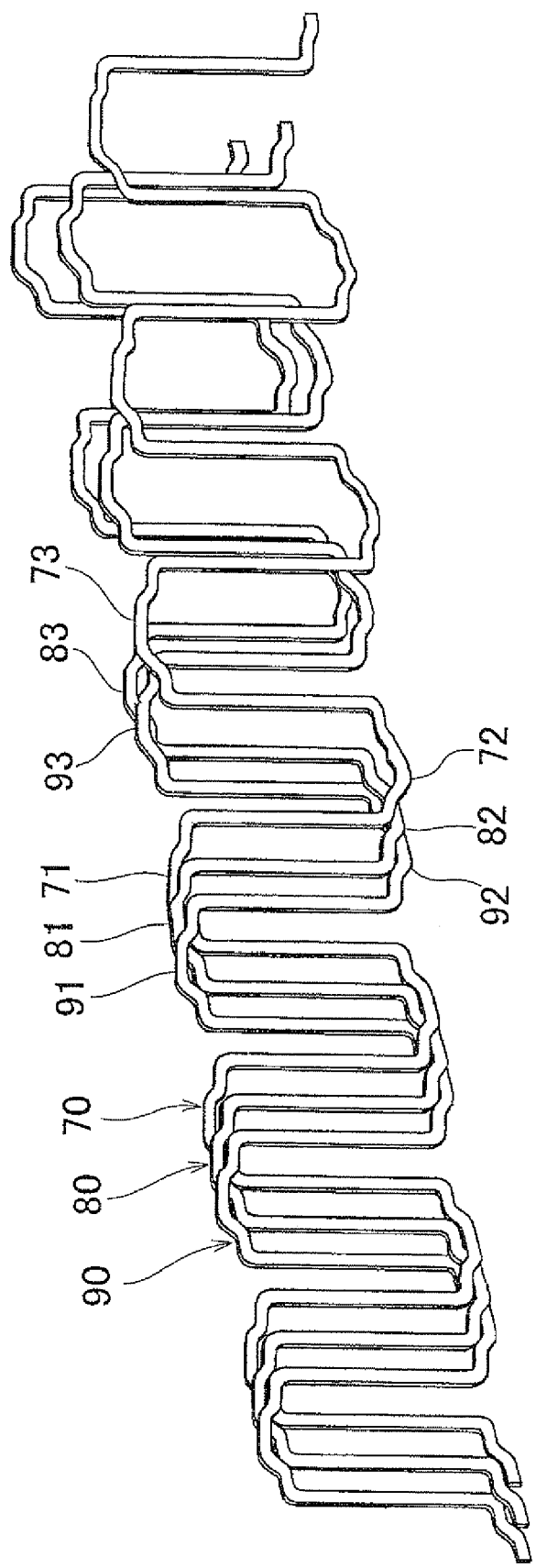
FIG. 18 is a perspective view shows two coil wires subjected to a moving step, as performed following that in FIG. 17.

The production method includes a sequence of an arrangement step, as illustrated in FIG. 14, an engagement step, as illustrated in FIG. 15, a first turning step, as illustrated in FIG. 16, a crossing step, as not shown, a second turning step, as illustrated in FIG. 17, and a moving step, as illustrated in FIG. 18.

First, in the arrangement step, the first, second, and third coil wires 70, 80, and 90 are arranged substantially parallel to each other and respectively offset, as illustrated in FIG. 14, by a given distance (e.g., approximately the pitch of the slots 14 and 15) in an axial direction or a lengthwise direction thereof (i.e., a lateral direction in FIG. 14 extending through the centers of the in-slot portions of the first to third coil wires 70 to 90). In the illustrated example, the turned portions of the first, second, and third coil wires 70, 80, and 90 have already been crossed over each other from the left side, as viewed in the drawing, to the turned portions 71, 81, and 91 in a previous one of wire twisting cycles which will be described below. The first to third coil wires 70 to 80 are placed, as viewed in the drawing, parallel to each other.

Untwisted portions of the first, second, and third coil wires 70, 80, and 90 are, as can be seen in FIG. 14, laid to overlap each other in parallel. The untwisted portion of the first coil wire 70 is located behind those of the second and third coil wires 80 and 90. The untwisted portion of the third coil wire 90 is located in front of those of the first and second coil wires 70 and 80. The untwisted portion of the second coil wire 80 is located between those of the first and third coil wires 70 and 90. In this example, the first coil wire 70 will also be referred to as the most-outwardly located coil in the direction in which the first to third coil wires 70 to 90 overlap each other. The first turned portion 81 of the second coil wire 80 has already been crossed over the first turned portion 91 of the third coil wire 90 frontward, as viewed in the drawing, in the previous wire twisting cycle. The following wire twisting cycle will start to twist or cross the first turned portion 71 of the first coil wire 70 over the first turned portions 81 and 91 of the second and third coil wires 80 and 90.

In the engagement step, as illustrated in FIG. 15, the first coil wire 70 is moved upward parallel to the second and third coil wires 80 and 90 to establish a mechanical engagement of the turned portion 78 of the first coil wire 70 located on the lower side in the widthwise direction thereof, as indicated by P, with the first turned portions 81 and 91 of the second and third coil wires 80 and 90 located on the upper side in the widthwise direction thereof. Note that the arrangement step in the first wire twisting cycle places the first to third coil wires 70 to 90 in parallel to each other in the lengthwise direction thereof, and the engagement step of the first wire twisting cycle lifts the first coil wire 70 upward until the left end 120 of the first coil wire 70 hits or engages the turned portions 181 and 191 of the second and third coil wires 80 and 90.

In the first turning step, as illustrated in FIG. 16, the first coil wire 70 is turned, as indicated by an arrow c, in a counterclockwise direction, as viewed in the drawing, that is, a direction in which a plane extends between the first and second coil wires 80 and 90 about the pivot P where the turned portion 78 of the first coil wire 70 engages the first turned portions 81 and 91 of the second and third coil wires 80 and 91 until the turned portion 72 the first coil wire 70 is spaced apart from the turned portions of the second and third coil wires 80 and 90 by a distance L2. Note that the distance L2 is a minimum interval between the turned portion 72 of the first coil wire 70 next to the turned portion 78 defining the pivot P and the second and third coil wires 80 and 90. The turning of the first coil wire 70 around the engagement (i.e., the pivot P) of the turned portion 78 of the first coil wire 70 with the first turned portions 81 and 91 of the second and third coil wires 80 and 91 allows the angle required to braid or twist the first to third coil wires 70 to 90 to be decreased as compared with the conventional manner. The second and third coil wires 80 and 90 may alternatively be turned in a clockwise direction relative to the first coil wire 70 in the same manner, as described above. In the first turning step of the first wire twisting cycle, the first coil wire 70 is turned in the counterclockwise direction about the engagement of the left end 120 of the first coil wire 70 with the turned portions 181 and 191 of the second and third coil wires 80 and 90.

In the crossing step, a right portion of the first coil wire 70 (i.e., the right side of the first turned portion 71) is moved ahead of the second and third coil wires 80 and 90 around the pivot P to cross the second turned portion 72 over the second turned portions 82 and 92 of the second and third coil wires 80 and 90. In other words, the first to third coil wires 70 to 90 are twisted one time at the pivot P.

In the second turning step, as illustrated in FIG. 17, the first coil wire 70 is turned, as indicated by an arrow d, in the clockwise direction (i.e., the direction opposite to that in the first turning step) about the pivot P to place the first coil wire 70 substantially parallel to the second and third coil wires 80 and 90 in the lengthwise direction thereof. The second and third coil wires 80 and 90 may alternatively be turned in the counterclockwise direction relative to the first coil wire 70 in the same manner, as described above.

In the moving step, the first coil wire 70 is moved down, as illustrated in FIG. 18, until the first coil wire 70 face in parallel to the second and third coil wires 80 and 90, that is, they overlap each other fully. This places the first to third coil wires 70 to 90 in a condition where the second turned portion 72 of the first coil wire 70 is twisted or crossed over the second turned portions 82 and 92 of the second and third coil wires 80 and 90. By the above sequence of steps, a portion of the first coil wire 70 on the right side of the first turned portion 71, as viewed in FIG. 18, has been moved from the outside to the inside of those of the second and third coil wires 80 and 90 (i.e., from behind the second coil wire 80 to ahead the third coil wire 90).

After the completion of the moving step of FIG. 18, that is, the wire twisting cycle, the location of the untwisted portion of the first coil wire 70 relative to those of the second and third coil wires 80 and 90 is reverse to that in FIG. 14. Specifically, the untwisted portion of the second coil wire 80 immediately adjacent the second turned portion 82 is located most rearward. Subsequently, the second coil wire 80 is subjected to the same sequence of steps as in FIGS. 14 to 18 to tie the third turned portion 83 of the second coil wire 80 together with the third turned portions 73 and 93 of the first and third coil wires 70 and 90.

Figure 19:
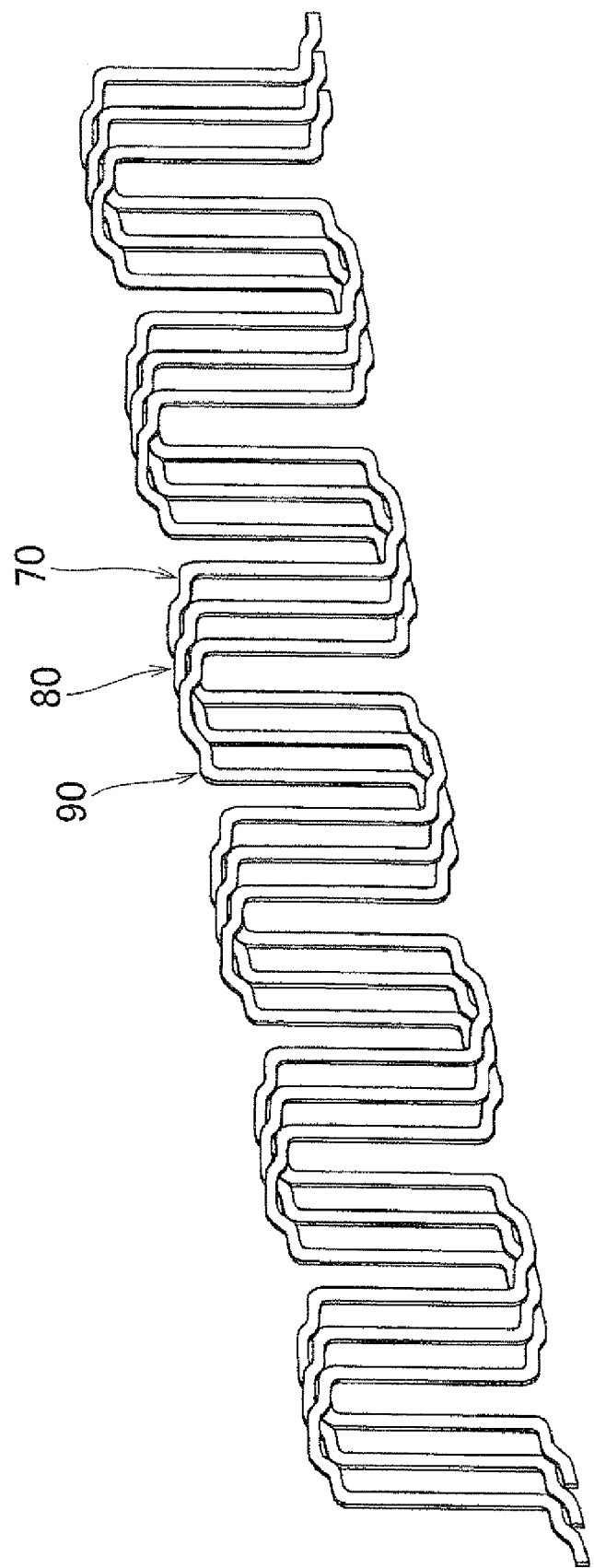
FIG. 19 is a perspective view shows the two coil wires twisted in the sequence of steps, as illustrated in FIGS. 14 to 18.

After completion of the above sequence of steps, the untwisted portion of one of the first to third coil wires 70 to 90 which is located most backward or outward is also subjected to the same sequence of steps as in FIGS. 14 to 18 to tie subsequent turned portions of the first to third turned portions 70 to 90 together. The above described twisting cycle is repeated several times to braid or twist, as illustrated in FIG. 19, the first to third coil wires 70 to 90 completely.

For example, four coil wire bundles each of which is formed by the first to third coil wires 70 to 90 twisted in the above manner are prepared. The four coil wire bundles are then twisted in the same manner, as described in FIGS. 14 to 18, to make a set of a total of twelve coil wires 70 to 90. This wire set is processed in the manner, as described in the first embodiment, and doughnut-shaped to complete the coil assembly 20, as illustrated in FIG. 3.

The wire set may alternatively be made by preparing and twisting twelve coil wires each of which is identical in shape with the first to third coil wires 70 to 90 in the same manner, as described in FIGS. 14 to 18, or by preparing the coil wire bundle(s) and twisting a required number of coil wires around the coil wire bundle(s), in sequence, in the same manner, as described in FIGS. 14 to 18.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A method of producing a coil assembly for use in an electric rotary machine, the coil assembly being to be wound in a core in which a plurality of slots are formed, the coil assembly including at least a first and a second coil wire each of which has a length made up of in-slot portions to be disposed in the slots of the core and turned portions, the in-slot portions extending substantially straight in parallel to each other, each of the turned portions connecting between adjacent two of the in-slot portions, the turned portions being located on a first side and a second side opposed across the width of a corresponding one of the first and second coil wires alternately, the method comprising the steps of:

an arrangement step of arranging the first and second coil wires substantially in parallel to each other, with the turned portions of the first coil wire being offset from those of the second coil wire in a lengthwise direction thereof;

an engagement step of moving the first coil wire substantially parallel to the second coil wire in a widthwise direction thereof to establish engagement of a first turned portion that is one of the turned portions of the first coil wire located on the first side with a first turned portion that is one of the turned portions of the second coil wire located on the second side;

a first turning step of turning a portion of the first coil wire, as located on a side of the engagement, relative to a portion of the second coil wire, as located on the side of the engagement, in the widthwise direction about a pivot where the first turned portions of the first and second coil wires engage;

a crossing step of crossing the portion of the first coil wire over the portion of the second coil wire around the pivot;

a second turning step of turning the portion of the first coil wire around the pivot relative to the portion of the second coil wire in a direction opposite that in the first turning step; and a moving step of moving the first coil wire relative to the second coil wire to place the first and second coil wires so as to extend substantially parallel to each other in the lengthwise direction thereof to twist the first turned portions of the first and second coil wires together.

2. The method as set forth in claim 1, wherein in said arrangement step, the turned portions of the first coil wire are offset from those of the second coil wire by a pitch of the slots of the core.

3. A method of producing a coil assembly for use in an electric rotary machine, the coil assembly being to be wound in a core in which a plurality of slots are formed, the coil assembly including a plurality of coil wires each of which has a length made up of in-slot portions to be disposed in the slots of the core and turned portions, the in-slot portions extending substantially straight in parallel to each other, each of the turned portions connecting between adjacent two of the in-slot portions, the turned portions being located on a first side and a second side opposed across the width of a corresponding one of the coil wires alternately, the method comprising the steps of:

an arrangement step of arranging a first and a second coil wire bundle, each of which is made up of a given number of the coil wires tied up together in a given condition, and placing the first and second coil wire bundles substantially in parallel to each other, with turned portions of the first coil wire bundle, each of which is a collection of the turned portions of the coil wires, being offset from those of the second coil wire bundle in a lengthwise direction thereof;

an engagement step of moving the first coil wire bundle substantially parallel to the second coil wire bundle in a widthwise direction thereof to establish engagement of a first turned portion that is one of the turned portions of the first coil wire bundle located on the first side with a first turned portion that is one of the turned portions of the second coil wire bundle located on the second side;

a first turning step of turning a portion of the first coil wire bundle, as located on a side of the engagement, relative to a portion of the second coil wire bundle, as located on the side of the engagement, in the widthwise direction about a pivot where the first turned portions of the first and second coil wire bundles engage;

a crossing step of crossing the portion of the first coil wire bundle over the portion of the second coil wire bundle around the pivot;

a second turning step of turning the portion of the first coil wire bundle around the pivot relative to the portion of the second coil wire bundle in a direction opposite that in said first turning step; and a moving step of moving the first coil wire bundle relative to the second coil wire bundle to place the first and second coil wire bundles so as to extend substantially parallel to each other in the lengthwise direction thereof to twist the first turned portions of the first and second coil wire bundles together.

4. The method as set forth in claim 3, wherein in said arrangement step, the turned portions of the first coil wire bundle are offset from those of the second coil wire bundle by a distance associated with a pitch of the slots of the core.

* * * * *